US012624282B2

(12) United States Patent (10) Patent No.: US 12,624,282 B2

Shinohara (45) Date of Patent: May 12, 2026

(54) NITRIDE PHOSPHOR, AND METHOD FOR PRODUCING SAME

(71) Applicant: NICHIA CORPORATION, Anan (JP)

(72) Inventor: Takayuki Shinohara, Anan (JP)

(73) Assignee: NICHIA CORPORATION, Anan (JP)

( * ) Notice: Subject to any disclaimer, the term of this patent is extended or adjusted under 35 U.S.C. 154(b) by 749 days.

(21) Appl. No.: 18/047,457

(22) Filed: Oct. 18, 2022

(65) Prior Publication Data

US 2023/0124386 A1 Apr. 20, 2023

(30) Foreign Application Priority Data

Oct. 19, 2021 (JP) ................................. 2021-170982

(51) Int. Cl.
C09K 11/77 (2006.01)
C09K 11/08 (2006.01)

(52) U.S. Cl.
CPC .... C09K 11/77068 (2021.01); C09K 11/0883 (2013.01)

(58) Field of Classification Search
CPC ........................... C09K 11/7706–77068; C09K 11/7721–77218
See application file for complete search history.

(56) References Cited

U.S. PATENT DOCUMENTS

2009/0066230 A1* 3/2009 Hirosaki ............... C04B 35/581
313/504
2012/0019127 A1 1/2012 Hirosaki 2012/0319155 A1* 12/2012 Yoshimura ......... H10H 20/8513
257/E33.061
2013/0207146 A1 8/2013 Yoshimura et al.
2013/0328478 A1 12/2013 Emoto
2016/0312118 A1 10/2016 Fiedler et al.
2021/0324267 A1 10/2021 Sugita et al.
2023/0124386 A1* 4/2023 Shinohara ........ C09K 11/77068
252/301.4 F

FOREIGN PATENT DOCUMENTS

JP 2007231245 A 9/2007
JP 2016535800 A 11/2016
WO 2010110457 A1 9/2010
WO 2012014702 A1 2/2012
WO 2012067130 A1 5/2012
WO 2020054351 A1 3/2020
WO 2021193183 A1 9/2021

* cited by examiner

*Primary Examiner* — Matthew E. Hoban

(74) *Attorney, Agent, or Firm* — Hunton Andrews Kurth LLP

(57) ABSTRACT

Provided is a nitride phosphor with high emission intensity. The nitride phosphor includes: a group 1 element(s) including at least one selected from the group consisting of lithium, sodium, and potassium; a group 2 element(s) including at least one selected from the group consisting of magnesium, calcium, strontium, and barium; a group 13 element(s) including at least one selected from the group consisting of aluminum, gallium, and indium; a group 14 element(s) including at least one selected from the group consisting of silicon, germanium, and tin; nitrogen; and cerium. The nitride phosphor includes, as a host crystal, a crystal having the same crystal structure as $CaAlSiN_3$, wherein the internal quantum efficiency upon excitation at 450 nm is not less than 87%.

11 Claims, 2 Drawing Sheets

54

52

50

50

50

100

110

NITRIDE PHOSPHOR, AND METHOD FOR PRODUCING SAME

CROSS-REFERENCE TO RELATED APPLICATIONS

This application claims priority to Japanese Patent Application No. 2021-170982, filed on Oct. 19, 2021, the disclosure of which is hereby incorporated by reference in its entirety.

BACKGROUND

Field of the Invention

The present disclosure relates to a nitride phosphor, and a method for producing the same.

Description of the Related Art

An increased output from a light source device is demanded in, for example, an image projection apparatus (projector) that employs a micromirror display element or the like to project light emitted from the light source device onto a screen for displaying a color image. Accordingly, the phosphor used in the light source device is required to have a high output property.

For example, WO 2010/110457 describes a phosphor containing Li, Ca, Si, Al, O, N, and Ce, and including a crystal having the same crystal structure as $CaAlSiN_3$ as a host crystal.

SUMMARY

A first exemplary embodiment is a nitride phosphor having a composition containing: a group 1 element(s) including at least one selected from the group consisting of lithium, sodium, and potassium; a group 2 element(s) including at least one selected from the group consisting of magnesium, calcium, strontium, and barium; a group 13 element(s) including at least one selected from the group consisting of aluminum, gallium, and indium; a group 14 element(s) including at least one selected from the group consisting of silicon, germanium, and tin; nitrogen; and cerium. The nitride phosphor includes, as a host crystal, a crystal having the same crystal structure as $CaAlSiN_3$. The nitride phosphor shows an internal quantum efficiency of not less than 87% by excitation at 450 nm.

A second exemplary embodiment is a light-emitting device including: the nitride phosphor according to the first aspect; and an excitation light source having a peak emission wavelength within the range of 350 nm to 480 nm.

A third exemplary embodiment is a method of producing a nitride phosphor, the method including: providing a mixture containing: a group 1 element source containing at least one selected from the group consisting of lithium, sodium, and potassium; a group 2 element source containing at least one selected from the group consisting of magnesium, calcium, strontium, and barium; a group 13 element source containing at least one selected from the group consisting of aluminum, gallium, and indium; a group 14 element source containing at least one selected from the group consisting of silicon, germanium, and tin; and a cerium source; and subjecting the mixture to heat treatment in a sealed tungsten container, to obtain a heat-treated product. In the method of producing a nitride phosphor, at least one of the group 1 element source, the group 2 element source, the group 13 element source, and the group 14 element source constituting the mixture contains nitrogen.

According to one embodiment of the present disclosure, a nitride phosphor with which high emission intensity may be obtained, and a production method therefor may be provided.

DETAILED DESCRIPTION

Figure 1A:
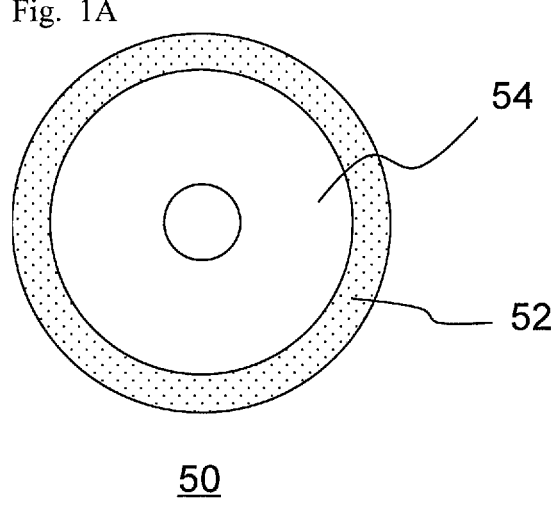
FIG. 1A is an exemplary schematic plan view of a wavelength conversion member as seen from a main-surface side.

In the present description, the term "step" includes not only an independent step, but also a step indistinguishable from another step as long as the desired purpose of the step can be achieved. Unless otherwise specified, when a plurality of substances corresponding to a certain component is present in a composition, the content of the component in the composition means the total amount of the plurality of substances present in the composition. The upper limit and lower limit of a numerical range described in the present description may be a combination of arbitrarily selected values exemplified as the numerical range. In each formula representing the composition of a phosphor in the present description, when a plurality of elements is separated by commas (,), it means that at least one of these plurality of elements is contained in the composition. In each formula representing the composition of a phosphor, a host crystal is described before a colon (:), and an activator element is described after the colon (:). In the present description, the relationship between color names and chromaticity coordinates, the relationship between light wavelength ranges and names of monochromatic lights, and the like are defined according to JIS Z8110. In the emission spectrum of a phosphor, the half-width of the phosphor means the wavelength width of the emission spectrum at which the emission intensity is 50% relative to the maximum emission intensity (full width at half maximum; FWHM). Embodiments of the present invention are described below in detail. The embodiments described below, however, are merely examples of the nitride phosphor and the method for producing the same for realization of the technological thought of the present invention. Therefore, the present invention is not limited to the nitride phosphor and the method for producing the same described below.

Nitride Phosphor

The nitride phosphor has a composition containing a group 1 element(s), a group 2 element(s), a group 13 element(s), a group 14 element(s), nitrogen, and cerium. The group 1 element includes at least one selected from the group consisting of lithium, sodium, and potassium. The group 2 element includes at least one selected from the group consisting of magnesium, calcium, strontium, and barium. The group 13 element includes at least one selected from the group consisting of aluminum, gallium, and indium. The group 14 element includes at least one selected from the group consisting of silicon, germanium, and tin. The nitride phosphor includes, as a host crystal, a crystal having the same crystal structure as $CaAlSiN_3$. The nitride phosphor shows an internal quantum efficiency of not less than 87% by excitation at a wavelength of 450 nm.

A nitride phosphor composed of particular elements, including, as a host crystal, a crystal having the same crystal structure as $CaAlSiN_3$ is capable of showing a high emission intensity when it is produced by the later-described production method. This may be thought to be due to, for example, the fact that a nitride phosphor obtained by the later-mentioned production method hardly shows compositional variation caused by scattering of constituent elements from the raw-material mixture, and hence that the composition is in a state close to the theoretical composition.

The composition of the nitride phosphor may contain a group 1 element(s) including at least one selected from the group consisting of lithium (Li), sodium (Na), and potassium (K). The group 1 element(s) may include at least lithium, and may further include sodium. The molar content of the group 1 element(s) in the composition of the nitride phosphor, when the total molar content of the group 13 element(s) and the group 14 element(s) described below is taken as 2, may be more than 0 and less than 1. The molar content of the group 1 element(s) may be preferably not less than 0.1 or not less than 0.15, and may be preferably not more than 0.8, not more than 0.7, or not more than 0.5. In cases where the group 1 element(s) in the composition of the nitride phosphor include(s) sodium, the molar content of the sodium, when the total molar content of the group 13 element(s) and the group 14 element(s) is taken as 2, may be more than 0 and not more than 0.03. The molar content of the sodium may be preferably not less than 0.0001 or not less than 0.00015, and may be preferably not more than 0.01, not more than 0.005, not more than 0.001, not more than 0.0008, not more than 0.0005, or not more than 0.0003.

The composition of the nitride phosphor may contain a group 2 element(s) including at least one selected from the group consisting of magnesium (Mg), calcium (Ca), strontium (Sr), and barium (Ba). The group 2 element(s) may include at least calcium, and may further include strontium. The molar content of the group 2 element(s) in the composition of the nitride phosphor, when the total molar content of the group 13 element(s) and the group 14 element(s) described below is taken as 2, may be 0.3 to 1.0. The molar content of the group 2 element(s) may be preferably not less than 0.35, not less than 0.4, or not less than 0.5, and may be preferably not more than 0.8 or not more than 0.7. In cases where the group 2 element(s) include(s) calcium, the molar content of the calcium, when the total molar content of the group 13 element(s) and the group 14 element(s) is taken as 2, may be more than 0 and less than 1. The molar content of the calcium may be preferably not less than 0.3, not less than 0.35, not less than 0.4, or not less than 0.5, and may be preferably not more than 0.8, not more than 0.75, or not more than 0.7. In cases where the group 2 element(s) include(s) strontium, the molar content of the strontium, when the total molar content of the group 13 element(s) and the group 14 element(s) is taken as 2, may be not less than 0 and less than 1. The molar content of the strontium may be preferably not less than 0.01 or not less than 0.05, and may be preferably not more than 0.4, not more than 0.3, or not more than 0.25.

The composition of the nitride phosphor may contain a group 13 element(s) including at least one selected from the group consisting of aluminum (Al), gallium (Ga), and indium (In). The group 13 element(s) may include at least aluminum. The molar content of the group 13 element(s) in the composition of the nitride phosphor, when the total molar content of the group 13 element(s) and the group 14 element(s) is taken as 2, may be more than 0 and less than 1. The molar content of the group 13 element(s) may be preferably not less than 0.4, not less than 0.45, or not less than 0.5, and may be preferably not more than 0.7, not more than 0.65, not more than 0.62, or not more than 0.61.

The composition of the nitride phosphor may contain a group 14 element(s) including at least one selected from the group consisting of silicon (Si), germanium (Ge), and tin (Sn). The group 14 element(s) may include at least silicon. The molar content of the group 14 element(s) in the composition of the nitride phosphor, when the total molar content of the group 13 element(s) and the group 14 element(s) is taken as 2, may be more than 1 and less than 2. The molar content of the group 14 element(s) may be preferably not less than 1.3, not less than 1.35, or not less than 1.37, and may be preferably not more than 1.6, not more than 1.55, or not more than 1.5.

The composition of the nitride phosphor contains nitrogen (N). The molar content of the nitrogen in the composition of the nitride phosphor, when the total molar content of the group 13 element(s) and the group 14 element(s) is taken as 2, may be not less than 2.7 and not more than 3.3. The molar content of the nitrogen may be preferably not less than 2.8 or not less than 2.9, and may be preferably not more than 3.2 or not more than 3.1.

The composition of the nitride phosphor may contain cerium (Ce). The molar content of the cerium in the composition of the nitride phosphor, when the total molar content of the group 13 element(s) and the group 14 element(s) is taken as 2, may be more than 0 and not more than 0.1. The molar content of the cerium may be preferably not less than 0.001 or not less than 0.005, and may be preferably not more than 0.05 or not more than 0.03.

The composition of the nitride phosphor may contain oxygen (O). The molar content of the oxygen in the composition of the nitride phosphor, when the total molar content of the group 13 element(s) and the group 14 element(s) is taken as 2, may be more than 0 and not more than 0.3. The molar content of the oxygen may be preferably not less than 0.001 or not less than 0.005, and may be preferably not more than 0.07 or not more than 0.05.

The nitride phosphor may have a composition represented by the following Formula (I).

$$(Li_sNa_tCa_uSr_v)Al_wSi_xN_yO_k:Ce_z \tag{I}$$

In the formula, $s$, $t$, $u$, $v$, $w$, $x$, $y$, $z$, and $k$ may satisfy $0<s<1$, $0\leq t\leq 0.03$, $0<u<1$, $0\leq v<1$, $0<w<1$, $1<x<2$, $2.7\leq y\leq 3.3$, $0<z\leq 0.1$, and $0\leq k\leq 0.3$. Preferably, they may satisfy $0.15\leq s\leq 0.5$, $0.00015\leq t\leq 0.0003$, $0.5\leq u\leq 0.7$, $0.05\leq v\leq 0.3$, $0.5\leq w\leq 0.61$, $1.37\leq x\leq 1.5$, $2.9\leq y\leq 3.1$, $0.005\leq z\leq 0.03$, and $0\leq k\leq 0.05$. Further, they may satisfy $0<s+t+u+v+z\leq 1$ or $0.75\leq s+t+u+v+z\leq 1$, and may satisfy $1.9\leq w+x\leq 2.1$.

The nitride phosphor may be a solid solution of a first nitride having a composition which contains Li, Si, and N, and which may contain Na, the first nitride including, as a host crystal, a crystal having the same crystal structure as $CaAlSiN_3$, and a second nitride which contains at least one of the elements Ca and Sr, and which contains Al, Si, and N, the second nitride including, as a host crystal, a crystal having the same crystal structure as $CaAlSiN_3$. In the composition of the nitride phosphor, part of the Li, Ca, and Sr may be replaced by Ce. The first nitride may have, for example, a composition represented by $(Li,Na)Si_2N_3$. The second nitride may have, for example, a composition represented by $(Ca,Sr)AlSiN_3$. Thus, the nitride phosphor may have a composition represented by the following Formula (II).

$$((Li,Na)Si_2N_3)_p \cdot ((Ca,Sr)AlSiN_3)_q : Ce_r \qquad (II)$$

In Formula (II), p, q, and r satisfy $0<p<1$, $0<q<1$, $0<r\leq0.1$, and $p+q=1$. They may preferably satisfy $0.1\leq p\leq0.6$ or $0.15\leq p\leq0.5$; $0.1\leq q\leq0.8$ or $0.15\leq q\leq0.7$; and $0<r\leq0.1$, $0.001\leq r\leq0.02$, or $0.004\leq r\leq0.01$.

The nitride phosphor may be a solid solution of a first nitride having a composition which contains Li, Si, and N, and which may contain Na, the first nitride including, as a host crystal, a crystal having the same crystal structure as $CaAlSiN_3$, a second nitride which contains at least one of the elements Ca and Sr, and which contains Al, Si, and N, the second nitride including, as a host crystal, a crystal having the same crystal structure as $CaAlSiN_3$, and a third nitride which contains Si, N, and O, the third nitride having the same crystal structure as $CaAlSiN_3$. In the composition of the nitride phosphor, part of the Li, Ca, and Sr may be replaced by Ce. The first nitride may have, for example, a composition represented by $(Li,Na)Si_2N_3$. The second nitride may have, for example, a composition represented by $(Ca,Sr)AlSiN_3$. The third nitride may have, for example, a composition represented by $Si_2N_2O$. Thus, the nitride phosphor may have a composition represented by the following Formula (IIa).

$$(Li,Na)Si_2N_3)_p \cdot ((Ca,Sr)AlSiN_3)_q \cdot (Si_2N_2O)_{(1-p-q)} : Ce_r \qquad (IIa)$$

In Formula (IIa), p, q, and r satisfy $0<p<1$, $0<q<1$, $0<r\leq0.1$, and $p+q<1$. They may preferably satisfy $0.1\leq p\leq0.6$ or $0.15\leq p\leq0.5$; $0.1\leq q\leq0.8$ or $0.15\leq q\leq0.7$; $0<r\leq0.1$, $0.001\leq r\leq0.02$, or $0.004\leq r\leq0.01$; and $0.7\leq p+q<1$ or $0.95\leq p+q\leq0.995$.

The internal quantum efficiency of the nitride phosphor is, for example, not less than 87%. The internal quantum efficiency of the nitride phosphor may be preferably not less than 88% or not less than 89%. The internal quantum efficiency is measured by, for example, using a quantum efficiency measurement system (manufactured by Otsuka Electronics Co. Ltd.; product name, QE-2100) at room temperature (25° C.)

The reflectance of the nitride phosphor at a wavelength of 730 nm may be not less than 89%. The reflectance of the nitride phosphor at a wavelength of 730 nm may be preferably not less than 90% or not less than 91%. The upper limit of the reflectance of the nitride phosphor at a wavelength of 730 nm may be, for example, not more than 99%. The reflectance of the nitride phosphor is measured by, for example, using a spectrofluorometer (manufactured by Hitachi High-Tech Science Corporation; product name, F-4500).

The nitride phosphor may have a median diameter of 20 μm to 50 μm. The median diameter of the nitride phosphor may be preferably not less than 23 μm or not less than 25 μm, and may be preferably not more than 45 μm or not more than 40 μm. The median diameter of the nitride phosphor is measured as the particle size corresponding to the volume accumulation of 50% from the small-diameter side in the particle size distribution on a volume basis. The particle size distribution on a volume basis is measured using a laser diffractive particle size distribution measurement apparatus (manufactured by Malvern Panalytical, Mastersizer 3000).

The peak emission wavelength of the nitride phosphor may be, for example, not less than 550 nm, or may be preferably not less than 560 nm or not less than 570 nm. The upper limit of the peak emission wavelength of the nitride phosphor may be, for example, not more than 620 nm, or may be preferably not more than 610 nm or not more than 600 nm. The half-width of the nitride phosphor in the emission spectrum may be, for example, not less than 110 nm, or may be preferably not less than 120 nm or not less than 125 nm. The upper limit of the half-width may be, for example, not more than 150 nm, or may be preferably not more than 140 nm or not more than 135 nm. The maximum excitation wavelength of the nitride phosphor may be within the wavelength range of, for example, 320 nm to 500 nm, or may be preferably within the wavelength range of 420 nm to 480 nm.

Light-Emitting Device

The light-emitting device includes the nitride phosphor and an excitation light source having a peak emission wavelength within the range of 350 nm to 480 nm. The light-emitting device may include a wavelength conversion member, and may include the nitride phosphor in the wavelength conversion member. Preferably, the peak emission wavelength of the excitation light source may be within the wavelength range of 380 nm to 470 nm, or may be within the wavelength range of 400 nm to 460 nm. By using an excitation light source having a peak emission wavelength within this wavelength range, a light-emitting device that emits a mixed-color light of the light from the excitation light source and the fluorescence from the phosphor may be constituted. Further, since part of the light radiated from the excitation light source may be effectively used as part of the light emitted from the light-emitting device to the outside, a light-emitting device having high emission efficiency may be obtained.

The half-width in the emission spectrum of the excitation light source may be, for example, not more than 30 nm. As the excitation light source, for example, a semiconductor light-emitting element using a nitride semiconductor is preferably used. The use of the semiconductor light-emitting element as the excitation light source enables production of a light-emitting device which is highly efficient, which shows high linearity of output in response to an input, which has high resistance to mechanical impacts, and which is stable. The semiconductor light-emitting element may be a light-emitting diode (LED), or may be a laser diode (LD). As the semiconductor light-emitting element, a single kind of element may be used, or two or more kinds of elements may be used in combination.

Wavelength Conversion Member

The wavelength conversion member includes a support and a phosphor layer containing a phosphor, the phosphor layer being placed on the support. By combination of the wavelength conversion member with a light-emitting element, a light-emitting device may be composed. By inclusion of the above-described nitride phosphor as a phosphor, the emission intensity of the output light may be increased in proportion to the output from the light-emitting element, and emission properties having excellent linearity may be obtained, to achieve excellent emission properties.

Figure 1B:
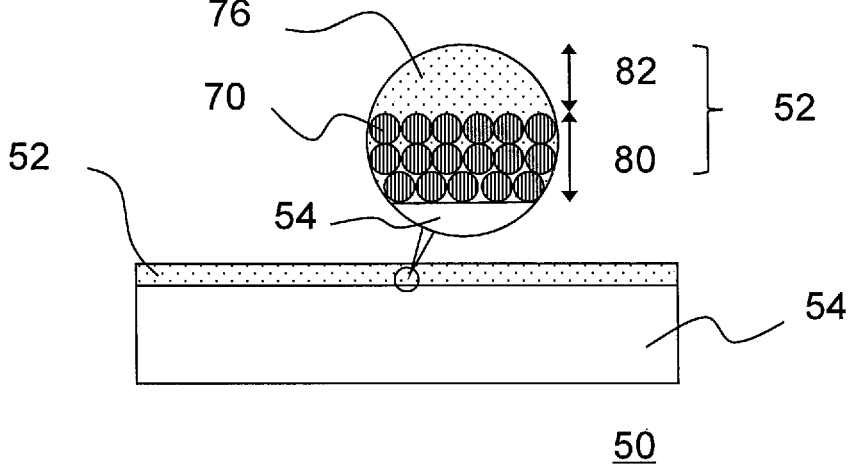
FIG. 1B is an exemplary schematic side view of a wavelength conversion member as seen from the side-surface side, and a partial magnified image thereof.

An exemplary wavelength conversion member is schematically illustrated in FIG. 1A and FIG. 1B. FIG. 1A is an exemplary schematic plan view of a wavelength conversion member 50 as seen from a main-surface side. FIG. 1B is an exemplary schematic side view of a wavelength conversion member 50 as seen from the side-surface side, and a partial magnified image thereof. As illustrated in FIG. 1A, a wavelength conversion layer 52 is placed along the circumference of a disk-shaped support 54. Further, as illustrated in FIG. 1B, a phosphor layer 80 including a phosphor 70, and a light-transmitting layer 82 including a resin 76, are layered on one main surface of the support 54 in this order, to place the wavelength conversion layer 52.

The output power of the light-emitting element in terms of the light power density of the incident light into the wavelength conversion member may be not less than $0.5$ W/mm$^2$, or may be preferably not less than $5$ W/mm$^2$ or not less than $10$ W/mm$^2$. The upper limit of the output power of the light-emitting element may be, for example, not more than $1000$ W/mm$^2$, or may be preferably not more than $500$ W/mm$^2$ or not more than $150$ W/mm$^2$. In cases where the output of the light-emitting element is within the range described above, the wavelength conversion member emits light with an output power in accordance with the output power from the light-emitting element.

Figure 2:
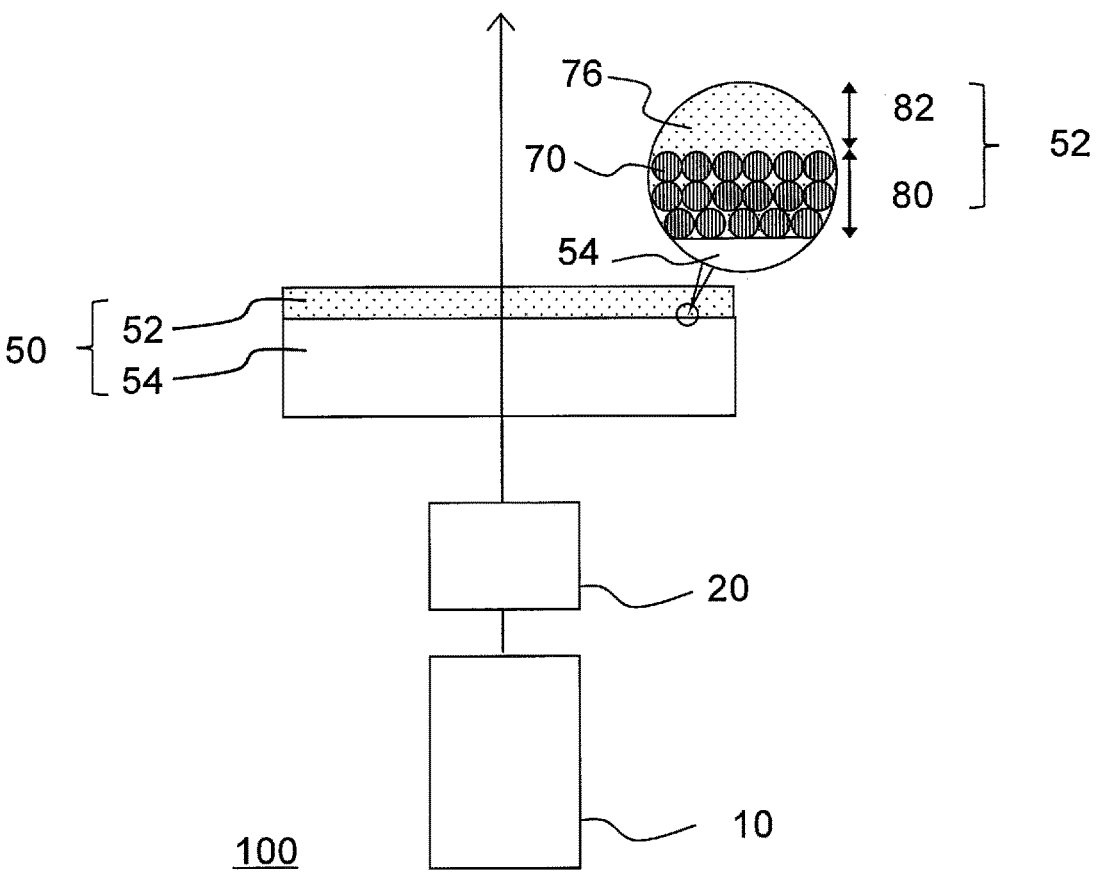
FIG. 2 is an exemplary schematic configuration diagram illustrating one example of the configuration of a light-emitting device.

An exemplary configuration of the light-emitting device is described below with reference to drawings. FIG. 2 is an exemplary schematic configuration diagram illustrating one example of the configuration of the light-emitting device. A light-emitting device 100 includes a light-emitting element 10, an incidence optical system 20, and a wavelength conversion member 50. The wavelength conversion member 50 includes a support 54 and a wavelength conversion layer 52. The wavelength conversion layer 52 is placed on the support 54, and includes: a phosphor layer 80 containing a phosphor 70; and a light-transmitting layer 82 containing a resin 76. Light emitted from the light-emitting element 10 passes through the incidence optical system 20, and then enters the wavelength conversion member 50 from the support 54 side, followed by passing through the phosphor layer 80 containing the phosphor 70, in which at least part of the incident light undergoes wavelength conversion by the phosphor 70. Alternatively, the light that has undergone the wavelength conversion, and the remaining part of the incident light that has not undergone the wavelength conversion, are emitted together from the wavelength conversion member 50. In this case, the light emitted from the light-emitting device 100 is a mixed-color light of the light from the light-emitting element 10 and the light that has undergone the wavelength conversion.

Figure 3:
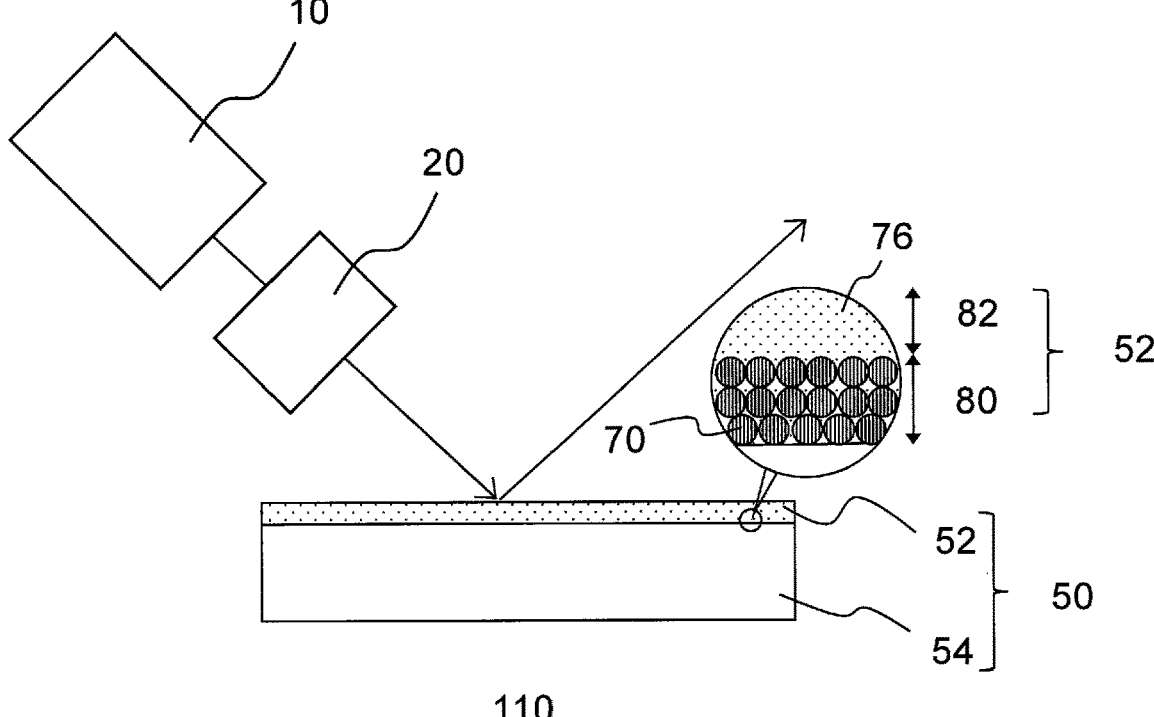
FIG. 3 is an exemplary schematic configuration diagram illustrating one example of the configuration of a light-emitting device.

FIG. 3 is an exemplary schematic configuration diagram illustrating one example of the configuration of the light-emitting device. A light-emitting device 110 includes a light-emitting element 10, an incidence optical system 20, and a wavelength conversion member 50. The wavelength conversion member 50 includes: a support 54; and a wavelength conversion layer 52 which is placed on the support 54 and in which a phosphor layer 80 containing a phosphor 70, and a light-transmitting layer 82 containing a resin 76, are layered in this order. Light emitted from the light-emitting element 10 passes through the incidence optical system 20, and then enters the wavelength conversion member 50 from the wavelength conversion layer 52 side. After undergoing wavelength conversion by the wavelength conversion layer 52, reflected light is emitted from the wavelength conversion layer 52. Here, the support 54 is a member on which the wavelength conversion layer 52 is placed, and the support 54 also functions as a member in which at least part of the light from the phosphor layer 80 side is reflected by the main surface on which the wavelength conversion layer 52 is placed. At least part of the light that passes through the wavelength conversion layer 52 undergoes wavelength conversion by the phosphor 70. Alternatively, the light that has undergone the wavelength conversion, and the remaining part of the incident light that has not undergone the wavelength conversion, are emitted together from the wavelength conversion member 50. In this case, the light emitted from the light-emitting device 110 is a mixed-color light of the light from the light-emitting element 10 and the light that has undergone the wavelength conversion.

Light Source Device for Projector

The light source device for a projector includes, as a component, the light-emitting device described above. By inclusion of a light-emitting device showing excellent emission properties at a high output level, a high-power projector may be constituted.

The light-emitting device including a wavelength conversion member in the present disclosure may be used not only as a light source device for a projector, but also as a light-emitting device to be contained in a light source in, for example, a general lighting device such as a ceiling light; a special lighting device such as a spotlight, a stadium lighting, or a studio lighting; a vehicle lighting device such as a headlight; a projection device such as a head-up display; an endoscopic light; an imaging device such as a digital camera, a mobile phone, or a smartphone; or a liquid crystal display device for a personal computer (PC) monitor, a laptop personal computer, a television, a personal digital assistant (PDX), a smartphone, a tablet PC, a mobile phone, or the like.

The wavelength conversion member constituting the light-emitting device includes at least one of the above-described nitride phosphors as a first phosphor. The wavelength conversion member may include, in addition to the above-described nitride phosphors, a second phosphor having a configuration different from that of the above-described nitride phosphors. Specific examples of the second phosphor include $Y_3Al_5O_{12}$:Ce, $(La,Y)_3Si_6N_{11}$:Ce, and $(Ca, Sr)AlSiN_3$:Ce.

Method for Producing Nitride Phosphor

The method for producing the nitride phosphor includes: a providing step of providing a mixture containing: a group 1 element source containing at least one selected from the group consisting of lithium, sodium, and potassium; a group 2 element source containing at least one selected from the group consisting of magnesium, calcium, strontium, and barium; a group 13 element source containing at least one selected from the group consisting of aluminum, gallium, and indium; a group 14 element source containing at least one selected from the group consisting of silicon, germanium, and tin; and a cerium source; and a heat treatment step of subjecting the mixture to heat treatment in a sealed tungsten container, to obtain a heat-treated product. At least one of the group 1 element source, the group 2 element source, the group 13 element source, and the group 14 element source constituting the mixture may include nitrogen.

By subjecting the mixture containing the element sources constituting the nitride phosphor to the heat treatment in a sealed tungsten container, a nitride phosphor capable of showing high emission intensity may be efficiently produced. This may be thought to be due to, for example, the fact that, compared to a sealed boron nitride container or the like, a sealed tungsten container allows production of a nitride phosphor having a composition closer to the fed composition because of a high sealing property. It is also thought that, by using a sealed tungsten container, loss of constituent elements by scattering from the mixture may be avoided to enable heat treatment at a higher temperature, and hence that a nitride phosphor showing high emission intensity may be obtained.

The group 1 element in the group 1 element source contained in the mixture includes at least one selected from the group consisting of lithium, sodium, and potassium. The group 1 element source may include at least a lithium source, and may further include a sodium source.

Examples of the group 1 element source include a metal compound containing a group 1 element; a simple metal of a group 1 element; and an alloy containing a group 1 element. Examples of the metal compound containing a group 1 element include hydrides, oxides, hydroxides, nitrides, oxynitrides, halides (for example, fluorides and chlorides), amide compounds, imide compounds, and azides, containing a group 1 element. Nitrides, halides, amide compounds, imide compounds, and azides are preferred. The metal compound containing a group 1 element; the simple metal of a group 1 element; the alloy containing a group 1 element; or the like; may be provided by purchasing. Alternatively, a metal compound containing a desired group 1 element, a simple metal of a desired group 1 element, an alloy containing a desired group 1 element, or the like may be produced for the use. As the group 1 element source, a single kind of source may be used, or two or more kinds of sources may be used in combination.

The purity of the group 1 element source (for example, a metal compound containing a group 1 element) is, for example, not less than 95% by mass, preferably not less than 99.5% by mass. In cases where the purity is not less than the predetermined value, the effect of impurities may be decreased to further increase the emission intensity of the nitride phosphor.

The content of the group 1 elements contained in the group 1 element source in the mixture, when the total content of the group 13 elements and the group 14 elements in the mixture is taken as 2 mole, may be more than 0 mole and not more than 1 mole. The content of the group 1 elements may be preferably not less than 0.1 mole, not less than 0.15 mole, not less than 0.2 mole, or not less than 0.3 mole, and may be preferably not more than 0.8 mole or not more than 0.7 mole.

The mixture preferably includes at least a lithium source as a group 1 element source, and may include a sodium source in addition to the lithium source. In cases where the group 1 element source in the mixture includes a lithium source, the content ratio of the lithium source in the group 1 element source may be, for example, 25 mol % to 100 mol %. The content ratio of the lithium source may be preferably not less than 30 mol % or not less than 40 mol %, and may be preferably not more than 70 mol % or not more than 60 mol %.

In cases where the mixture includes a sodium source, the content ratio of the sodium source in the mixture may be, for example, 0.1% by mass to 10% by mass. The content ratio of the sodium source may be preferably not less than 4% by mass or not less than 5% by mass, and may be preferably not more than 8% by mass or not more than 7% by mass. The sodium source contained in the mixture may include at least one selected from the group consisting of sodium amide, sodium fluoride, sodium azide, and sodium nitride.

The group 2 element in the group 2 element source contained in the mixture includes at least one selected from the group consisting of magnesium, calcium, strontium, and barium. The group 2 element source may include at least a calcium source, and may further include a strontium source.

Examples of the group 2 element source include a metal compound containing a group 2 element; a simple metal of a group 2 element; and an alloy containing a group 2 element. Examples of the metal compound containing a group 2 element include: hydrides, oxides, hydroxides, nitrides, oxynitrides, halides, amide compounds, imide compounds, and azides; and compounds capable of producing a nitride by heat treatment; containing a group 2 element. At least one selected from the group consisting of these may be contained. The metal compound containing a group 2 element may preferably include at least one selected from the group consisting of nitrides, halides (for example, fluorides and chlorides), hydrides, amide compounds, imide compounds, and the like. The metal compound containing a group 2 element; the simple metal of a group 2 element; the alloy containing a group 2 element; or the like; may be provided by purchasing. Alternatively, a metal compound containing a desired group 2 element, a simple metal of a desired group 2 element, an alloy containing a desired group 2 element, or the like may be produced for the use. As the group 2 element source, a single kind of source may be used, or two or more kinds of sources may be used in combination.

The purity of the group 2 element source (for example, a metal compound containing a group 2 element) is, for example, not less than 95% by mass, preferably not less than 99.5% by mass. In cases where the purity is not less than the predetermined value, the effect of impurities may be decreased to further increase the emission intensity of the nitride phosphor.

The content of the group 2 element contained in the group 2 element source in the mixture, when the total content of the group 13 element and the group 14 element in the mixture is taken as 2 mole, may be more than 0.3 mole and not more than 1.0 mole. The molar content of the group 2 element may be preferably not less than 0.35 mole or not less than 0.4 mole, and may be preferably not more than 0.8 mole or not more than 0.7 mole.

The mixture preferably includes at least a calcium source as a group 2 element source, and may include a strontium source in addition to the calcium source. In cases where the group 2 element source in the mixture includes a calcium source and a strontium source, the content ratio of the calcium source in the group 2 element source may be, for example, not less than 50 mol % and less than 100 mol %. The content ratio of the calcium source may be preferably not less than 60 mol % or not less than 70 mol %, and may be preferably not more than 90 mol % or not more than 85 mol %. The content ratio of the strontium source in the group 2 element source may be, for example, more than 0 mol % and not more than 50 mol %. The content ratio of the strontium source may be preferably not less than 10 mol % or not less than 15 mol %, and may be preferably not more than 40 mol % or not more than 30 mol %.

The group 13 element in the group 13 element source contained in the mixture includes at least one selected from the group consisting of aluminum, gallium, and indium. The group 13 element source may include at least an aluminum source.

Examples of the group 13 element source include a metal compound containing a group 13 element; a simple metal of a group 13 element; and an alloy containing a group 13 element. Examples of the metal compound containing a group 13 element include: hydrides, oxides, hydroxides, nitrides, oxynitrides, halides (for example, fluorides and chlorides), amide compounds, imide compounds, and azides; and compounds capable of producing a nitride by heat treatment; containing a group 13 element. At least one selected from the group consisting of these may be contained. The metal compound containing a group 13 element may preferably include at least one selected from the group consisting of nitrides, halides, hydrides, amide compounds, imide compounds, and the like. The metal compound containing a group 13 element; the simple metal of a group 13 element; the alloy containing a group 13 element; or the like;

may be provided by purchasing. Alternatively, a metal compound containing a desired group 13 element, a simple metal of a desired group 13 element, an alloy containing a desired group 13 element, or the like may be produced for the use. As the group 13 element source, a single kind of source may be used, or two or more kinds of sources may be used in combination.

The purity of the group 13 element source (for example, a metal compound containing a group 13 element) is, for example, not less than 95% by mass, preferably not less than 99.5% by mass. In cases where the purity is not less than the predetermined value, the effect of impurities may be decreased to further increase the emission intensity of the nitride phosphor.

The content of the group 13 element contained in the group 13 element source in the mixture, when the total content of the group 13 element and the group 14 element in the mixture is taken as 2 mole, may be more than 0 mole and less than 1 mole. The content of the group 13 element may be preferably more than 0.4 mole, not less than 0.45 mole, or not less than 0.5 mole, and may be preferably not more than 0.7 mole, not more than 0.65 mole, not more than 0.62 mole, or not more than 0.61 mole.

In cases where the mixture includes at least an aluminum source as a group 13 element source, part of the aluminum in the aluminum source may be replaced by another metal such as gallium, indium, vanadium, chromium, or cobalt. In cases where the aluminum source includes another metal, the content ratio of the other metal may be, for example, not more than 10 mol %, preferably not more than 5 mol % relative to the aluminum. The lower limit of the content ratio of the other metal is, for example, not less than 1 mol %.

The group 14 element in the group 14 element source contained in the mixture includes at least one selected from the group consisting of silicon, germanium, and tin. The group 14 element source may include at least a silicon source.

Examples of the group 14 element source include a compound containing a group 14 element; a simple group 14 element; and an alloy containing a group 14 element. Examples of the compound containing a group 14 element include: hydrides, oxides, hydroxides, nitrides, oxynitrides, halides (for example, fluorides and chlorides), amide compounds, imide compounds, and azides; and compounds capable of producing a nitride by heat treatment; containing a group 14 element. At least one selected from the group consisting of these may be contained. The metal compound containing a group 14 element may preferably include at least one selected from the group consisting of nitrides, halides, hydrides, amide compounds, imide compounds, and the like. The compound containing a group 14 element; the simple group 14 element; the alloy containing a group 14 element; or the like; may be provided by purchasing. Alternatively, a compound containing a desired group 14 element, a desired simple group 14 element, an alloy containing a desired group 14 element, or the like may be produced for the use. As the group 14 element source, a single kind of source may be used, or two or more kinds of sources may be used in combination.

The purity of the group 14 element source (for example, a compound containing a group 14 element) is, for example, not less than 95% by mass, preferably not less than 99.5% by mass. In cases where the purity is not less than the predetermined value, the effect of impurities may be decreased to further increase the emission intensity of the nitride phosphor.

The content of the group 14 element contained in the group 14 element source in the mixture, when the total content of the group 13 element and the group 14 element in the mixture is taken as 2 mole, may be more than 1 mole and less than 2 moles. The content of the group 14 element may be preferably not less than 1.3 moles, not less than 1.35 moles, or not less than 1.37 moles, and may be preferably not more than 1.6 moles, not more than 1.55 moles, or not more than 1.5 moles.

In cases where the mixture includes at least a silicon source as a group 14 element source, part of the silicon in the silicon source may be replaced by another group IV metal such as germanium, tin, titanium, zirconium, or hafnium. In cases where the silicon source includes another group IV metal, the content ratio of the other group IV metal may be, for example, not more than 10 mol %, preferably not more than 5 mol % relative to the silicon. The lower limit of the content ratio is, for example, not less than 1 mol %.

The cerium source contained in the mixture may be, for example, a compound containing cerium, simple cerium element, or an alloy containing cerium. The cerium source may be at least one selected from the group consisting of these. Examples of the compound containing cerium include: oxides, halides (for example, fluorides and chlorides), nitrides, hydrides, amide compounds, and imide compounds; and compounds and alloys capable of producing cerium nitride by heat treatment. At least one selected from the group consisting of these may be contained. Specific examples of the cerium compound include cerium oxide, cerium nitride, cerium fluoride, cerium hydride, and cerium amide. At least one selected from the group consisting of these may be contained. The compound may preferably include at least one selected from the group consisting of cerium oxide, cerium nitride, and cerium fluoride. The compound may more preferably include at least cerium oxide or cerium fluoride. As the cerium source, a single kind of source may be used, or two or more kinds of sources may be used in combination.

The purity of the cerium source may be, for example, not less than 95% by mass, preferably not less than 99.5% by mass. In cases where the purity is not less than the predetermined value, the effect of impurities may be decreased to further increase the emission intensity of the phosphor.

The content of the cerium contained in the cerium source in the mixture, when the total content of the group 13 element and the group 14 element in the mixture is taken as 2 mole, may be more than 0 mole and not more than 0.1 mole. The content of the cerium may be preferably not less than 0.001 mole or not less than 0.005 mole, and may be preferably not more than 0.05 mole or not more than 0.03 mole.

In the mixture, part of the cerium in the cerium source may be replaced by a rare-earth metal(s) such as europium, scandium, yttrium, lanthanum, praseodymium, neodymium, samarium, gadolinium, terbium, dysprosium, holmium, erbium, thulium, ytterbium, and/or lutetium. In cases where the cerium source contains another rare-earth metal, the content ratio of the other rare-earth metal may be, for example, not more than 10 mol %, preferably not more than 5 mol % relative to the cerium. The lower limit of the content ratio is, for example, not less than 1 mol %.

At least one of the group 1 element source, the group 2 element source, the group 13 element source, and the group 14 element source constituting the mixture may include nitrogen; all of the group 1 element source, the group 2 element source, the group 13 element source, and the group 14 element source may include nitrogen; or at least the group 1 element source, the group 2 element source, and the group 13 element source may include nitrogen. Thus, at least one of the group 1 element source, the group 2 element source, the group 13 element source, and the group 14 element source may serve also as the nitrogen source; all of the group 1 element source, the group 2 element source, the group 13 element source, and the group 14 element source may serve also as the nitrogen source; or at least the group 1 element source, the group 2 element source, and the group 13 element source may serve also as the nitrogen source. Examples of the nitrogen source include nitrides, oxynitrides, amide compounds, imide compounds, and azides.

The mixture may also include at least one metal fluoride. Examples of the metal fluoride include fluorides of group 2 elements, and alkali metal fluorides. The metal fluoride may include at least a group 2 element, and may also include lithium, sodium, potassium, boron, aluminum, or the like in addition to the group 2 element. The group 2 element contained in the fluoride of the group 2 element is at least one selected from the group consisting of Mg, Ca, Sr, and Ba. At least Ca, and at least one selected from the group consisting of Mg, Sr, and Ba are preferably contained. At least one of Ca and Sr is more preferably contained. The metal fluoride may serve also as at least part of the group 1 element source (such as a lithium source), the group 2 element source (such as a calcium source and/or a strontium source), and/or the like. The content of the metal fluoride in the mixture may be a content at which the ratio of the number of moles (molar content ratio) of fluorine atoms to the total number of moles of the group 13 element and the group 14 element contained in the group 13 element source and the group 14 element source is, for example, 0.02 to 0.3. The molar content ratio is preferably not less than 0.02 and less than 0.3, more preferably 0.02 to 0.27, still more preferably 0.03 to 0.18, still more preferably 0.04 to 0.13. In cases where the molar content ratio is not less than the lower limit value described above, the effect as a flux may be sufficiently obtained. Further, in cases where the molar content ratio is not more than the upper limit value described above, the effect of the flux may be obtained without including an excessive amount of the flux.

The purity of the metal fluoride is, for example, not less than 95% by mass, preferably not less than 99% by mass. In cases where the purity is not less than the predetermined value, the effect of impurities may be decreased to further increase the emission intensity of the phosphor. A purchased metal fluoride may be used, or a desired metal fluoride may be produced and used.

The mixture may further include, in addition to the metal fluoride, a flux such as another halide. Examples of the halide include chlorides of a rare earth, an alkali metal, or the like. In cases where the raw-material mixture includes a flux of a halide, its content is, for example, not more than 20% by mass, or may be preferably not more than 10% by mass, not more than 5% by mass, or 1% by mass, relative to the metal fluoride.

The mixture may include an oxygen source. Examples of the oxygen source include oxides, hydroxides, oxynitrides, and carbonates. The oxygen source may serve also as at least one selected from the group consisting of the group 1 element source, the group 2 element source, the group 13 element source, the group 14 element source, and the cerium source. The oxygen source may preferably serve also as at least one selected from the group consisting of the group 14 element source and the cerium source.

In cases where the mixture includes an oxygen source, the content of oxygen atoms contained in the oxygen source in the mixture, when the total content of the group 13 element and the group 14 element in the mixture is taken as 2 mole, may be more than 0 mole and not more than 0.1 mole. The content of oxygen atoms may be preferably not less than 0.003 mole or not less than 0.005 mole, and may be preferably not more than 0.05 mole or not more than 0.04 mole.

The mixture used for the preparation of the nitride phosphor may be prepared by mixing the group 1 element source, the group 2 element source, the group 13 element source, the group 14 element source, and the cerium source together at predetermined ratios of their amounts. The content ratios of the group 1 element source, the group 2 element source, the group 13 element source, the group 14 element source, and the cerium source in the mixture may be appropriately selected according to the composition of the nitride phosphor of interest. For example, the content ratios of the group 1 element source, the group 2 element source, the group 13 element source, the group 14 element source, and the cerium source in the mixture may be almost the same as those in the composition of the nitride phosphor, or may be different therefrom when evaporation of the element sources is taken into account.

The mixture may be obtained by weighing the components constituting the mixture such that desired mixing ratios are achieved, and then mixing the components together by, for example, a mixing method using a ball mill or the like, a mixing method using a mixer such as a Henschel mixer, V-type blender, or the like, or a mixing method using a mortar and a pestle. The mixing may be carried out by dry blending, or may be carried out by wet blending by addition of a solvent or the like.

In the heat treatment step, the provided mixture is subjected to heat treatment in a sealed tungsten container, to obtain a heat-treated product. By subjecting the mixture to the heat treatment in a sealed tungsten container, a nitride phosphor capable of showing high emission intensity may be efficiently produced. The sealed container in which the heat treatment of the mixture is carried out may be formed substantially with tungsten. The term "substantially" herein means that impurities inevitably contained are not eliminated.

The sealed container herein means a container capable of preventing contamination with solid foreign substances under normal conditions of handling, transportation, or storage (according to, for example, item 37 of General Notices of Japanese Pharmacopoeia). The sealed container includes, for example: a container body in which an opening is formed; and a lid for sealing the opening of the container body; such that transfer of solids from and into the container under the heat treatment conditions can be prevented. The sealed container may enable suppression of transfer of a gas under the heat treatment conditions, but does not necessarily need to be capable of completely preventing such transfer. Regarding the shape of the container body of the sealed container, for example, the container body may have a bottom portion, and a wall portion surrounding the bottom portion. An opening section may be formed in the upper part facing to the bottom portion. The shape of the container body may be a cylindrical shape, a polygonal column shape, a rectangular shape, or the like. In the sealed tungsten container, at least the portion to be in contact with the raw-material mixture may be formed substantially with tungsten, or preferably, the whole sealed container may be formed substantially with tungsten.

The amount of the mixture to be placed in the sealed container may be, for example, 60% by volume to 100% by volume, or may be preferably 75% by volume to 99% by volume, relative to the capacity of the sealed container.

In the method for producing the nitride phosphor, use of the sealed tungsten container may suppress scattering of the group 1 element source (especially lithium) and the like contained in the mixture, and their reaction with the heat treatment container, during the heat treatment. For example, the lithium persistence rate, which is the ratio of the content (number of moles) of lithium contained in the obtained heat-treated product to the content (number of moles) of lithium contained in the mixture, may be, for example, not less than 75%, or may be preferably not less than 80% or not less than 85%. In cases where the lithium persistence rate is not less than the predetermined value, the emission intensity of the nitride phosphor tends to be improved. The upper limit of the lithium persistence rate may be not more than 100% or not more than 98%.

The temperature during the heat treatment may be, for example, not less than 1300° C. and not more than 2100° C., or may be preferably not less than 1800° C. or not less than 1900° C. The temperature during the heat treatment may be preferably not more than 2080° C., not more than 2060° C., or not more than 2000° C. In cases where the heat treatment is carried out at a temperature of not less than the lower limit value, cerium may easily enter the crystal, so that a desired nitride phosphor may be efficiently formed. Further, in cases where the heat treatment temperature is not more than the upper limit value, degradation of the nitride phosphor formed tends to be suppressed. The heat treatment of the raw-material mixture may be carried out using, for example, a gas pressurization electric furnace.

The atmosphere in the heat treatment of the mixture is preferably an atmosphere containing nitrogen gas, more preferably substantially a nitrogen gas atmosphere. By using an atmosphere containing nitrogen gas, silicon contained in the raw material may be nitrided. Further, degradation of the nitride raw material and the phosphor may be suppressed. In cases where the atmosphere in the heat treatment of the mixture contains nitrogen gas, the atmosphere may also contain another gas, such as hydrogen; a noble gas, for example, argon; carbon dioxide; carbon monoxide; oxygen; or ammonia. The content ratio of the nitrogen gas in the atmosphere in the heat treatment of the mixture is, for example, not less than 90% by volume, preferably not less than 95% by volume. In cases where the content ratio of the gas containing an element other than nitrogen is not more than the predetermined value, a decrease in the emission intensity due to formation of impurities by the gas component may be suppressed.

The pressure during the heat treatment of the raw-material mixture may be, for example, from normal pressure to 200 MPa. From the viewpoint of suppressing degradation of the nitride phosphor produced, the pressure is preferably high. The gauge pressure is preferably 0.1 MPa to 200 MPa, more preferably 0.5 MPa to 20 MPa. The gauge pressure is still more preferably 0.6 MPa to 1.2 MPa since, in this case, there is hardly a limitation of the industrial equipment.

The heat treatment of the mixture is carried out by, for example, increasing the temperature from room temperature to a predetermined temperature. The heating time may be, for example, 1 hour to 48 hours. The heating time may be preferably not less than 2 hours or not less than 5 hours, and may be preferably not more than 30 hours or not more than 20 hours. In cases where the heating time is not less than the lower limit value, the growth of nitride phosphor particles tends to proceed sufficiently, and cerium tends to easily enter the nitride phosphor crystal.

In the heat treatment of the mixture, a retention time at a predetermined temperature may be provided. The retention time may be, for example, 0.5 hour to 48 hours. The retention time may be preferably not less than 1 hour or not less than 2 hours, and may be preferably not more than 20 hours or not more than 10 hours. In cases where the retention time is not less than the lower limit value, uniform particle growth may be further promoted. In cases where the retention time is not more than the upper limit value, degradation of the phosphor may be further suppressed.

In the heat treatment of the mixture, the cooling time from the predetermined temperature to room temperature may be, for example, 0.1 hours to 20 hours. The cooling time may be preferably not less than 1 hour or not less than 3 hours, and may be preferably not more than 15 hours or not more than 12 hours.

The heat treatment step may be followed by a sizing step in which the heat-treated product containing the nitride phosphor obtained in the heat treatment step is subjected to a combination of treatments such as disintegration, pulverization, washing, and/or classification treatment. By the sizing step, a powder having a desired particle size may be obtained. More specifically, the nitride phosphor may be subjected to coarse pulverization, and then to pulverization to achieve a predetermined particle size using a common pulverizer such as a ball mill, jet mill, or vibration mill. The washing may be carried out using, for example, a liquid medium containing water, such as deionized water or an acidic aqueous solution.

The nitride phosphor contained in the heat-treated product obtained by the heat treatment step may have an internal quantum efficiency of, for example, not less than 87%. The internal quantum efficiency of the nitride phosphor may be preferably not less than 88% or not less than 90%. Details of the composition of the nitride phosphor are as described above.

EXAMPLES

The present invention is described below more concretely by way of Examples. However, the present invention is not limited by these Examples.

Example 1

$Ca_3N_2$, $CaF_2$, $LiNH_2$, $Si_3N_4$, AlN, and $CeO_2$ were used as raw-material compounds. The raw-material compounds were weighed and mixed in a glove box with a nitrogen gas atmosphere such that the molar ratios of the elements Ca:Li:Ce:Si:Al were 0.594:0.400:0.006:1.4:0.6 in terms of the fed composition ratio, to obtain a mixture. At this time, the compounds were weighed such that, of the molar ratio 0.594 of Ca, $Ca_3N_2$ contributes to a fraction of 0.576, which correspond to about 97 mol %, and $CaF_2$ contributes to a fraction of 0.018, which correspond to about 3 mol %. The raw-material mixture was filled into a crucible made of a tungsten (W) material, and the crucible was sealed by covering with a lid. In a nitrogen gas atmosphere ($N_2$ gas, 100% by volume), heat treatment was carried out at a gauge pressure of 0.92 MPa at 1850° C. The heat treatment time during which the temperature was kept at 1850° C. was 3 hours. After the heat treatment, no temperature adjustment was carried out, and the mixture was naturally allowed to cool to room temperature, to obtain a heat-treated product. The heat-treated product obtained was pulverized, and then washed by dispersion in deionized water, followed by acid washing using hydrochloric acid, and then classification treatment to obtain a nitride phosphor of Example 1.

Example 2

$Ca_3N_2$, $Li_3N$, $Si_3N_4$, AlN, and $CeF_3$ were used as raw-material compounds. The raw-material compounds were weighed and mixed in a glove box with a nitrogen gas atmosphere such that the molar ratios of the elements Ca:Li:Ce:Si:Al were 0.591:0.400:0.009:1.4:0.6 in terms of the fed composition ratio, to obtain a mixture of the raw materials. The raw-material mixture was filled into a crucible made of a tungsten (W) material, and the crucible was sealed by covering with a lid. In a nitrogen gas atmosphere ($N_2$ gas, 100% by volume), heat treatment was carried out at a gauge pressure of 0.92 MPa at 1950° C. The heat treatment time during which the temperature was kept at 1950° C. was particle size distribution on a volume basis. The particle size distribution on a volume basis was measured using a laser diffractive particle size distribution measurement apparatus (manufactured by Malvern Panalytical, Mastersizer 3000).
Composition Analysis For each nitride phosphor obtained as described above, composition analysis was carried out using an ICP-AES apparatus (manufactured by Perkin Elmer) and an ion chromatography system (manufactured by Thermo Fisher Scientific Inc./manufactured by (former) Nippon Dionex K.K.). The molar content ratio of each element was calculated taking the total of Al and Si contained in the composition as 2 moles. The molar amount of lithium contained in the nitride phosphor was divided by the molar amount of lithium contained in the mixture of the raw-material compounds, to calculate the lithium persistence rate (%). The results are shown in Table 2.

TABLE 1

| | Crucible material | Heat treating temperature (° C.) | Cerium molar ratio | Emission properties | | | | |
| | | | | Peak emission wavelength (nm) | Relative emission intensity (%) | Internal quantum efficiency (%) | Reflectance at 730 nm (%) | Median diameter (μm) |
|---|---|---|---|---|---|---|---|---|
| Example 1 | Tungsten | 1850 | 0.006 | 589 | 112 | 90 | 92.3 | 25.2 |
| Example 2 | Tungsten | 1950 | 0.009 | 593 | 120 | 91 | 94.2 | 35.0 |
| Comparative Example 1 | Boron nitride | 1850 | 0.006 | 581 | 100 | 76 | 87.3 | 24.8 |

3 hours. After the heat treatment, no temperature adjustment was carried out, and the mixture was naturally allowed to cool to room temperature, to obtain a heat-treated product. The heat-treated product obtained was pulverized, and then washed by dispersion in deionized water, followed by acid washing using hydrochloric acid, and then classification treatment to obtain a nitride phosphor of Example 2.

Comparative Example 1

A nitride phosphor of Comparative Example 1 was obtained in the same manner as in Example 1 except that the raw-material mixture was filled into a crucible made of a boron nitride (BN) material instead of the tungsten (W) material.
Evaluation
Emission Properties Emission properties of each nitride phosphor were measured using a quantum efficiency measurement apparatus QE-2000 (manufactured by Otsuka Electronics Co. Ltd.) with an excitation light having a wavelength of 450 nm. For each of the nitride phosphors of Example 1 and Example 2, the relative emission intensity (%) was calculated taking the emission intensity of the nitride phosphor of Comparative Example 1 as 100%. The results are shown in Table 1. Table 1 also shows the heat treatment temperature, and the molar ratio of cerium as calculated by taking the total of Si and Al in the mixture as 2 moles.
Reflectance The reflectance of the nitride phosphor was measured using a spectrofluorometer (manufactured by Hitachi High-Tech Science Corporation; product name, F-4500).
Median Diameter (Dm)

The median diameter of the nitride phosphor was measured as the particle size corresponding to the volume accumulation of 50% from the small-diameter side in the

TABLE 2

| | Composition analysis (Al + Si = 2 basis) | | | | | lithium persistence rate |
| | Li | Ca | Ce | Al | Si | (%) |
|---|---|---|---|---|---|---|
| Example 1 | 0.375 | 0.581 | 0.005 | 0.606 | 1.394 | 94 |
| Comparative Example 1 | 0.288 | 0.598 | 0.005 | 0.601 | 1.399 | 72 |

As shown in Table 1, it can be seen that Examples 1 and 2, in which the crucible material was tungsten, showed higher emission intensities and higher internal quantum efficiencies than Comparative Example 1, in which the crucible material was boron nitride. As shown in Table 2, according to comparison with Comparative Example 1, a molar content ratio of lithium closer to that in the fed composition ratio could be obtained in Example 1. It can thus be seen that, according to comparison with Comparative Example 1, in which the crucible material was boron nitride, scattering of lithium during the heat treatment was better suppressed in Example 1, in which the crucible material was tungsten, to produce a nitride phosphor having a composition closer to the theoretical value.

Comparative Example 2

$Ca_3N_2$, $Li_3N$, $Si_3N_4$, AlN, and $CeF_3$ were used as raw-material compounds. The raw-material compounds were weighed and mixed in a glove box with a nitrogen gas atmosphere such that the molar ratios of the elements Ca:Li:Ce:Si:Al were 0.585:0.400:0.015:1.4:0.6 in terms of the fed composition ratio, to obtain a mixture of the raw materials. The raw-material mixture was filled into a crucible made of a tungsten (W) material, and the crucible was sealed by covering with a lid. In a nitrogen gas atmosphere ($N_2$ gas, 100% by volume), heat treatment was carried out at a gauge pressure of 0.92 MPa at 1950° C. The heat treatment 2 moles. Table 4 shows the results of composition analysis obtained in the same manner as described above.

TABLE 3

| | | | | Emission properties | | | |
| | Crucible material | Lithium molar ratio | Sodium molar ratio | Peak emission wavelength (nm) | Relative emission intensity (%) | Internal quantum efficiency (%) | Reflectance at 730 nm (%) |
|---|---|---|---|---|---|---|---|
| Comparative Example 2 | Tungsten | 0.4 | 0 | 600 | 114 | 82 | 85.9 |
| Comparative Example 3 | Tungsten | 0.3 | 0.1 | 592 | 112 | 78 | 83.1 |
| Example 3 | Tungsten | 0.2 | 0.2 | 589 | 117 | 89 | 90.4 |
| Comparative Example 4 | Tungsten | 0.1 | 0.3 | 579 | 91 | 82 | 91.3 |
| Comparative Example 5 | Boron nitride | 0.2 | 0.2 | 583 | 49 | 27 | 45.1 | time during which the temperature was kept at 1950° C. was 3 hours. After the heat treatment, no temperature adjustment was carried out, and the mixture was naturally allowed to cool to room temperature, to obtain a heat-treated product. The heat-treated product obtained was pulverized to obtain a nitride phosphor of Comparative Example 2.

Comparative Example 3

$Ca_3N_2$, $Li_3N$, $NaNH_2$, $Si_3N_4$, AlN, and $CeF_3$ were used as raw-material compounds. A nitride phosphor of Comparative Example 3 was obtained in the same manner as in Comparative Example 2 except that the molar ratios of the elements Ca:Li:Na:Ce:Si:Al were 0.585:0.300:0.100:0.015:1.4:0.6 in terms of the fed composition ratio.

Example 3

A nitride phosphor of Example 3 was obtained in the same manner as in Comparative Example 3 except that the molar ratios of the elements Ca:Li:Na:Ce:Si:Al were 0.585:0.200:0.200:0.015:1.4:0.6 in terms of the fed composition ratio.

Comparative Example 4

A nitride phosphor of Comparative Example 4 was obtained in the same manner as in Comparative Example 3 except that the molar ratios of the elements Ca:Li:Na:Ce:Si:Al were 0.585:0.100:0.300:0.015:1.4:0.6 in terms of the fed composition ratio.

Comparative Example 5

A nitride phosphor of Comparative Example 5 was obtained in the same manner as in Comparative Example 2 except that the molar ratios of the elements Ca:Li:Na:Ce:Si:Al were 0.585:0.200:0.200:0.015:1.4:0.6 in terms of the fed composition ratio, and that the raw-material mixture was filled into a crucible made of a boron nitride (BN) material instead of the tungsten (W) material.
Evaluation
Each nitride phosphor obtained in Example 3 and Comparative Examples 2 to 5 was subjected to evaluation of the emission properties and the reflectance in the same manner as described above. The results are shown in Table 3. Table 3 also shows the molar ratios of lithium and sodium as calculated by taking the total of Si and Al in the mixture as As shown in Table 3, it can be seen that Example 3, which has a lithium molar ratio of 0.2 and a sodium molar ratio of 0.2, showed a higher emission intensity and a higher internal quantum efficiency than Comparative Examples 2 to 4, which have other lithium molar ratios and sodium molar ratios. It can also be seen that Example 3 and Comparative Examples 2 to 4, in which the crucible material was tungsten, showed remarkably higher emission intensities and internal quantum efficiencies than Comparative Example 5, in which the crucible material was boron nitride.

TABLE 4

| | Composition analysis (Al + Si = 2 basis) | | | | | | lithium persistence rate |
| | Li | Na | Ca | Ce | Al | Si | (%) |
|---|---|---|---|---|---|---|---|
| Comparative Example 2 | 0.329 | Below lower limit | 0.605 | 0.015 | 0.617 | 1.383 | 82 |
| Comparative Example 3 | 0.255 | 0.0001 | 0.599 | 0.015 | 0.614 | 1.386 | 85 |
| Example 3 | 0.166 | 0.0002 | 0.608 | 0.016 | 0.603 | 1.397 | 83 |
| Comparative Example 4 | 0.091 | 0.0018 | 0.609 | 0.015 | 0.618 | 1.382 | 91 |
| Comparative Example 5 | 0.053 | Below lower limit | 0.586 | 0.015 | 0.604 | 1.396 | 27 |

As shown in Table 4, regarding the molar content ratio of lithium, 82% to 91% of the molar ratio of lithium in the mixture before the heat treatment obtained by mixing the raw-material compounds remained in Example 3 and Comparative Examples 2 to 4, in which the crucible material was tungsten. In contrast, the remaining amount was only about 27% in Comparative Example 5, in which the crucible material was boron nitride. Thus, it can be seen that use of a crucible made of a tungsten material allows better suppression of scattering of lithium during the heat treatment, and hence that a nitride phosphor having a composition closer to the fed composition ratio, and having higher emission properties, can be obtained. Further, all of Example 3 and Comparative Examples 2 to 4 showed only small amounts of residual sodium. Scattering of sodium is known to occur extremely easily, and it is suggested that the scattering of sodium leads to defects in the nitride phosphor in terms of the crystal structure. It is thought, however, that, in the nitride phosphor according to Example 3, the amount of lithium and the amount of the defects in the nitride phosphor were appropriately controlled to achieve the high emission intensity and the high internal quantum efficiency.

Example 4

$Ca_3N_2$, $Sr_3N_2$, $Li_3N$, $Si_3N_4$, $SiO_2$, AlN, and $CeF_3$ were used as raw-material compounds. The raw-material compounds were weighed and mixed in a glove box with a nitrogen gas atmosphere such that the molar ratios of the elements Ca:Sr:Li:Ce:Si:Al:N:O were 0.495:0.100:0.400: 0.005:1.4:0.6:2.993:0.005 in terms of the fed composition ratio, to obtain a mixture of the raw materials. The raw-material mixture was filled into a crucible made of a tungsten (W) material, and the crucible was sealed by covering with a lid. In a nitrogen gas atmosphere ($N_2$ gas, 100% by volume), heat treatment was carried out at a gauge pressure of 0.92 MPa at 1950° C. The heat treatment time during which the temperature was kept at 1950° C. was 3 hours. After the heat treatment, no temperature adjustment was carried out, and the mixture was naturally allowed to cool to room temperature, to obtain a heat-treated product. The heat-treated product obtained was pulverized to obtain a nitride phosphor of Example 4.

Example 5

A nitride phosphor of Example 5 was obtained in the same manner as in Example 4 except that the molar ratios of the elements Ca:Sr:Li:Ce:Si:Al:N:O were 0.490:0.100:0.400: 0.010:1.4:0.6:2.987:0.010 in terms of the fed composition ratio.

Example 6

A nitride phosphor of Example 6 was obtained in the same manner as in Example 4 except that the molar ratios of the elements Ca:Sr:Li:Ce:Si:Al:N:O were 0.485:0.100:0.400: 0.015:1.4:0.6:2.980:0.015 in terms of the fed composition ratio.

Example 7

A nitride phosphor of Example 7 was obtained in the same manner as in Example 4 except that the molar ratios of the elements Ca:Sr:Li:Ce:Si:Al:N:O were 0.480:0.100:0.400: 0.020:1.4:0.6:2.973:0.020 in terms of the fed composition ratio.
Evaluation Each nitride phosphor obtained in Examples 4 to 7 was subjected to evaluation of the emission properties, the reflectance, and the median diameter in the same manner as described above. The results are shown in Table 5. Table 5 also shows the molar ratios of cerium, nitrogen atoms, and oxygen atoms as calculated by taking the total of Si and Al in the mixture as 2 moles.

As shown in Table 5, by preparing compositions such that an equal amount of oxygen (O) was contained in accordance with the changes in the molar ratio of cerium, phosphors having a high emission intensity and a high internal quantum efficiency could be obtained while the peak emission wavelength was controlled. It is thought that the nitride phosphors having a higher emission intensity and a higher internal quantum efficiency could be obtained since $Ce^{3+}$ as an activator tended to enter $Ca^{2+}$ sites, since part of nitrogen (N) was replaced by oxygen (O), and/or since, for example, an $Si_2N_2O$ phase was generated to form a solid solution to cause charge compensation.

A wavelength conversion member or a light-emitting device using the nitride phosphor of the present disclosure can be used as a wavelength conversion member or a light-emitting device to be contained in a light source in, for example, a general lighting device such as a ceiling light; a special lighting device such as a spotlight, a stadium lighting, or a studio lighting; a vehicle lighting device such as a headlight; a projection device such as a projector or a head-up display; an endoscopic light; an imaging device such as a digital camera, a mobile phone, or a smartphone; or a liquid crystal display device for a personal computer (PC) monitor, a laptop personal computer, a television, a personal digital assistant (PDA), a smartphone, a tablet PC, or a mobile phone.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve

TABLE 5

| | | | | Emission properties | | | | |
| | Cerium molar ratio | Nitorgen molar ratio | Oxgen molar ratio | Peak emission wavelength (nm) | Relative emission intensity (%) | Internal quantum efficiency (%) | Reflectance at 730 nm (%) | Median diameter (μm) |
| --- | --- | --- | --- | --- | --- | --- | --- | --- |
| Example 4 | 0.005 | 2.993 | 0.005 | 581 | 111 | 90 | 91.1 | 29.0 |
| Example 5 | 0.010 | 2.987 | 0.010 | 593 | 117 | 88 | 89.0 | 28.0 |
| Example 6 | 0.015 | 2.980 | 0.015 | 598 | 121 | 88 | 89.8 | 27.4 |
| Example 7 | 0.020 | 2.973 | 0.020 | 597 | 122 | 87 | 94.3 | 34.3 | the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A nitride phosphor comprising:
a group 1 element(s) including at least one selected from the group consisting of lithium, sodium, and potassium;
a group 2 element(s) including at least one selected from the group consisting of magnesium, calcium, strontium, and barium;
a group 13 element(s) including at least one selected from the group consisting of aluminum, gallium, and indium;
a group 14 element(s) including at least one selected from the group consisting of silicon, germanium, and tin;
nitrogen; and
cerium;
the nitride phosphor comprising, as a host crystal, a crystal having the same crystal structure as $CaAlSiN_3$,
wherein the internal quantum efficiency upon excitation at 450 nm is not less than 87%, and
wherein the nitride phosphor has a median diameter of 25 μm to 50 μm.

2. The nitride phosphor according to claim 1, wherein reflectance of the nitride phosphor at a wavelength of 730 nm is not less than 89%.

3. The nitride phosphor according to claim 1, having a composition represented by the following formula:

$$(Li_sNa_tCa_uSr_v)Al_wSi_xN_yO_k:Ce_z,$$

wherein s, t, u, v, w, x, y, z, and k satisfy $0<s<1$, $0≤t≤0.03$, $0<u<1$, $0≤v<1$, $0<w<1$, $1<x<2$, $2.7≤y≤3.3$, $0<z≤0.1$, and $0≤k≤0.3$.

4. The nitride phosphor according to claim 1, whose composition contains aluminum, silicon, and sodium, wherein, when the total of the molar content of aluminum and the molar content of silicon in the composition is taken as 2, the molar content of sodium is more than 0 and not more than 0.03.

5. A light-emitting device comprising:
the nitride phosphor according to claim 1; and
an excitation light source having a peak emission wavelength within the range of 350 nm to 480 nm.

6. A method for producing the nitride phosphor according to claim 1, comprising:
providing a mixture containing: a group 1 element source containing at least one selected from the group consisting of lithium, sodium, and potassium; a group 2 element source containing at least one selected from the group consisting of magnesium, calcium, strontium, and barium; a group 13 element source containing at least one selected from the group consisting of aluminum, gallium, and indium; a group 14 element source containing at least one selected from the group consisting of silicon, germanium, and tin; and a cerium source; and
subjecting the mixture to heat treatment in a sealed tungsten container, to obtain a heat-treated product;
wherein at least one of the group 1 element source, the group 2 element source, the group 13 element source, and the group 14 element source contains nitrogen.

7. The method for producing the nitride phosphor according to claim 6, wherein the composition of the nitride phosphor comprises lithium, and the ratio of the content of lithium contained in the heat-treated product to the content of lithium contained in the mixture is not less than 75%.

8. The method for producing the nitride phosphor according to claim 6, wherein the heat treatment is carried out at a temperature within the range of 1300° C. to 2100° C.

9. The method for producing the nitride phosphor according to claim 6, wherein the heat treatment is carried out in an atmosphere containing nitrogen gas at a gauge pressure within the range of 0.1 MPa to 200 MPa.

10. The method for producing the nitride phosphor according to claim 6, wherein the mixture comprises a sodium source, and the content of sodium in the mixture is 0.1% by mass to 5.0% by mass.

11. The method of producing the nitride phosphor according to claim 10, wherein the sodium source comprises at least one selected from the group consisting of sodium amide, sodium fluoride, sodium azide, and sodium nitride.

* * * * *